United States Patent [19]

Chambers, Jr.

[11] 3,825,698

[45] July 23, 1974

[54] TEST-THROUGH CIRCUIT FOR TELEPHONE SYSTEM VOLTAGE BOOSTERS

[75] Inventor: Charles W. Chambers, Jr., Amherst, Ohio

[73] Assignee: Lorain Products Corporation, Lorain, Ohio

[22] Filed: July 31, 1972

[21] Appl. No.: 276,696

[52] U.S. Cl. .............................................. 179/16 F

[51] Int. Cl. .............................................. H04q 1/30

[58] Field of Search ........... 179/16 F, 175.3, 175.31

[56] References Cited

UNITED STATES PATENTS

| | | | |
|---|---|---|---|
| 3,339,027 | 8/1967 | Feiner et al. | 179/16 F |
| 3,453,392 | 7/1969 | Zebe | 179/16 F |
| 3,671,676 | 6/1972 | Henry et al. | 179/16 F |
| 3,689,704 | 9/1972 | Wadding | 179/16 F |
| 3,757,052 | 9/1973 | Tothill | 179/16 F |

OTHER PUBLICATIONS

Bell Labs Record, Vol. 50, No. 2, February 1972, "Customer Lines Go Electronic," F. T. Andrews, Jr., pages 59–65.

*Primary Examiner*—Kathleen H. Claffy
*Assistant Examiner*—Randall P. Myers
*Attorney, Agent, or Firm*—Edward C. Jason

[57] ABSTRACT

A circuit for automatically disconnecting a voltage booster circuit which is in service in a subscriber line to prevent the booster circuit from interfering with the taking of voltage and current measurements on the line. The circuit includes booster disconnect switches which, in a first operative state, connect the voltage booster circuit in current increasing relationship to a subscriber line and which, in a second operative state, disconnect the voltage booster from the line and substitute therefor a bypass conductor. A control circuit responsive to the voltage between either subscriber line conductor and a reference of fixed potential controls the booster disconnect switches, as required, to establish the first operative state thereof when the subscriber line is not being tested and to establish the second operative state thereof when the line is being tested.

5 Claims, 1 Drawing Figure

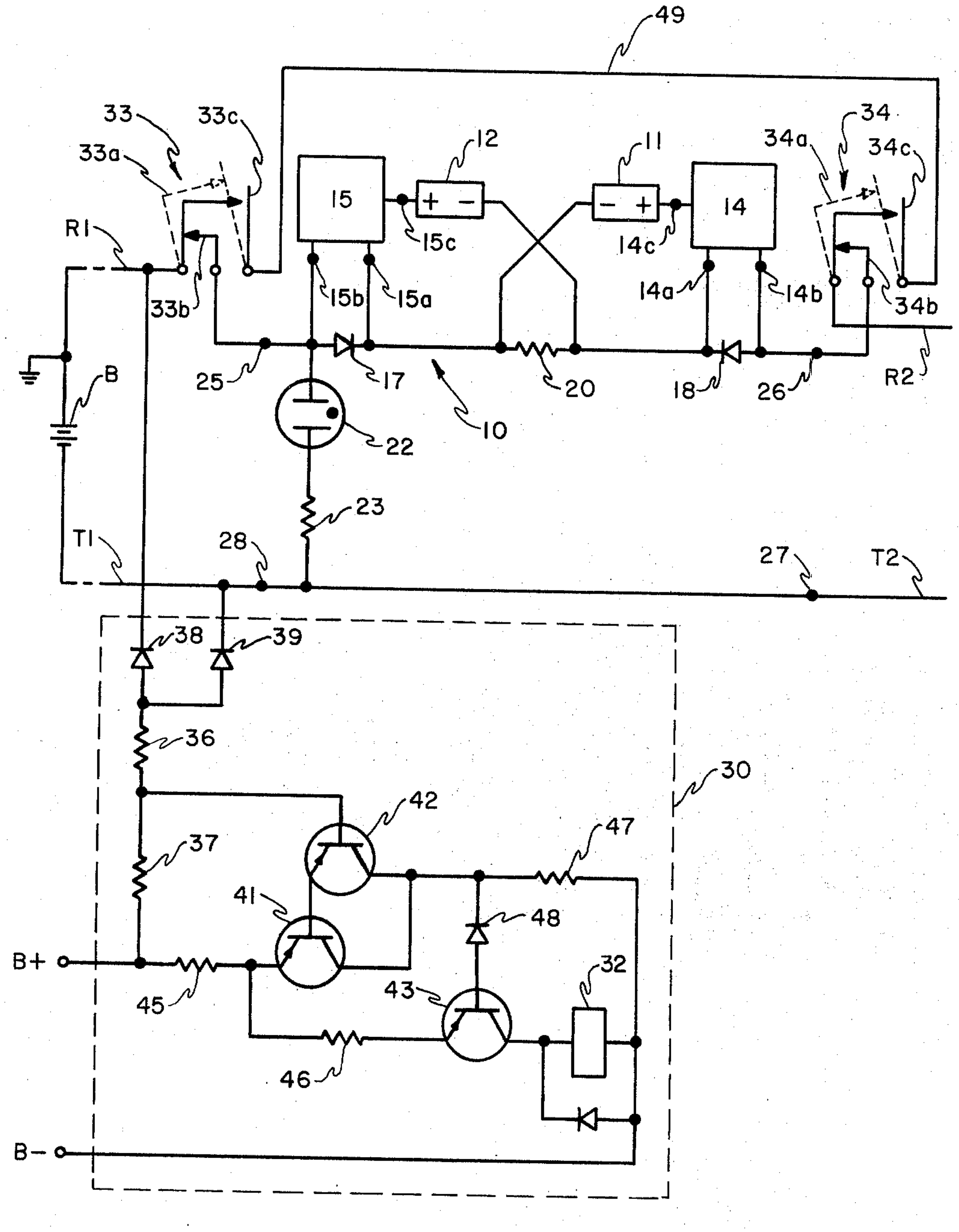
49
33
33c
33a
R1
33b
15
12
+ -
15c
15b
15a
11
- +
14c
14
14a
14b
34
34a
34c
34b
R2
B
25
17
10
20
18
26
22
23
T1
28
27
T2
38
39
36
30
42
37
47
41
48
B+
45
43
32
46
B-

TEST-THROUGH CIRCUIT FOR TELEPHONE SYSTEM VOLTAGE BOOSTERS

BACKGROUND OF THE INVENTION

The present invention relates to circuitry for use in connection with the d-c voltage booster circuits of a variety of types of telephone systems and is directed more particularly to circuitry for connecting and disconnecting voltage booster circuits in response to predetermined central office terminal voltage conditions.

An important consideration in the provision of telephone service is the maintenance of an adequate d-c current flow in each subscriber line. This subscriber line current performs a variety of telephone system operations including the operation of a dialing relay during dialing and the operation of a trip relay to terminate the ringing sound when the called party's receiver is lifted. If the subscriber line current is of insufficient magnitude, the above named relays and others will fail to operate and the telephone set or sets connected to that subscriber line will be useless.

The difficulty in establishing an adequate d-c current flow in each of a multiplicity of subscriber lines is that each subscriber line has a d-c resistance which is a function of the length of that line. For economic reasons it has been found advantageous to energize the majority of subscriber lines from a central office battery of generally adequate terminal voltage, and to provide a plurality of voltage booster circuits to increase the voltage applied to those relatively few subscriber lines having resistances too high to operate directly from the central office battery. These voltage booster circuits are arranged to add a d-c boost voltage in series aiding relationship between the central office battery and respective high resistance subscriber lines.

Because of the widespread use of reverse battery supervision, that is, the use of reversals in the polarity with which the central office battery is applied to a subscriber line for supervisory or control purposes, a voltage booster source which is connected in series-aiding relationship to the subscriber line current for one central office battery polarity is in series opposition and, therefore, in voltage reducing relationship to the subscriber line current for the opposite central office battery polarity. In order to overcome this problem, various voltage booster circuits have been developed which will coordinate the polarity of the serially added boost voltage with the then polarity of the central office battery so as to assure a series aiding relationship therebetween in the presence of supervisory polarity reversals.

In maintaining subscriber lines, including those which are serviced by voltage booster circuits, it is necessary to apply test voltages and currents to the line to measure the electrical characteristics thereof. Because the voltage booster circuitry can affect the magnitudes of the test voltages and currents, the voltage booster circuitry, when present, must be manually disabled or disconnected, during testing, to assure accurate test results. In central offices having large numbers of voltage boosters servicing lines which must be tested on a regular basis, the disabling or disconnecting of the voltage boosters has been time consuming and expensive.

One attempt to solve the problem of testing subscriber lines which are serviced by voltage boosters has involved the provision of voltage boosters which may be tested-through, that is, voltage boosters which have a negligible effect on the test voltages and currents applied to the subscriber line therethrough. While booster circuits having such a characteristic can be produced, they are complex, sophisticated and expensive. In addition, such test-through schemes are not adaptable for use with the many thousands of voltage booster circuits installed before the development of voltage booster circuits having inherent test-through characteristics.

In accordance with the present invention, there is provided highly effective and economical circuitry which allows subscriber lines to be tested without manually removing the voltage booster circuits serving them, which operates automatically upon the mere application of test equipment, which is adaptable for use in a wide variety of types of telephone systems and voltage booster circuit configurations, and which is usable with voltage booster circuits of existing types.

SUMMARY OF THE INVENTION

It is an object of the invention to provide test-through type circuitry for facilitating subscriber line testing in subscriber lines that are serviced by voltage booster circuits.

Another object of the invention is to provide circuitry of the above character which operates in the presence of a wide variety of types of voltage booster circuits and telephone systems.

It is another object of the invention to provide a test-through circuit which disconnects an associated voltage booster circuit and substitutes for it a bypass conductor, thus affording unrestricted and accurate testing of the subscriber line parameters.

Yet another object of the invention is to provide a test-through circuitry which affords the above described disconnecting and substituting activity automatically, upon the establishment of the conditions which are necessary for subscriber line testing.

Still another object of the invention is to provide test-through circuitry which operates in the desired manner without regard to the polarity with which the central office battery is applied to the subscriber line.

It is another object of the invention to provide test-through circuitry in which the connections of an associated voltage booster circuit are controlled by means of make-before-break type switches, thus assuring that the subscriber line does not become disconnected from the central office during automatic number identification.

It is still another object of the invention to provide test-through circuitry which operates satisfactorily in voltage booster circuits which service PBX systems, in spite of the insertion and removal of the PBX attendant's equipment from the trunk.

A further object of the invention is to provide test-through circuitry which is suitable for use in connection with voltage booster circuits of existing types.

DESCRIPTION OF THE DRAWINGS

The single FIGURE is a schematic diagram of one exemplary circuit embodying the invention.

DESCRIPTION OF THE INVENTION

Referring to FIG. 1 there is shown a voltage booster circuit 10 for additively increasing the d-c operating voltage which a central office battery B applies to the conductors R1 and T1 of a subscriber line and thus providing a boosted d-c operating voltage between conductors R2 and T2 of that line. Booster circuit 10 includes suitable d-c boost voltage supplies 11 and 12, controllable switching networks 14 and 15, unidirectional conducting elements 17 and 18, a current sensing resistor 20 and a biasing network which here take the form of a neon tube 22 and a resistor 23. These circuit elements are connected together between booster circuit terminals 25, 26, 27 and 28 to control the conduction of switching networks 14 and 15, in accordance with the direction of subscriber line current flow, to connect between terminals 25 and 26 that voltage boost supply, 11 or 12, which aids the flow of line current through conductors R1-R2 and T1-T2.

When, for example, the battery B is connected to conductors R1 and T1 and renders conductor R1 positive from conductor T1, subscriber line current will flow from battery B through the path including conductor R1, a switch contact 33*b*, diode 17 resistor 20, through control terminals 14*a* and 14*b* of switching network 14 and switch contact 34*b* to conductor R2. This current returns to battery B through conductors T2 and T1. Under these conditions, switching network 14 will begin to conductor subscriber line current through the path including conductor R1, switch contact 33*b*, diode 17, boost supply 11, through the power terminals 14*c* and 14*b* of switching network 14, and switch contact 34*b* to conductor R2. Because the voltage drop across power terminals 14*c* and 14*b* is negligible when switching network 14 conducts, the voltage from conductor T2 to conductor R2 will be approximately equal to the voltage across battery B plus the voltage across boost supply 11. Thus, when the central office applies a voltage of a first polarity to conductors R1 and T1, a boosted voltage of the same polarity appears between subscriber line conductors T2 and R2.

Similarly, when battery B is applied to conductors R1 and T1 and renders conductor T1 positive from conductor R1, subscriber line current flowing from conductor R2, through switch contact 34*b*, diode 18, resistor 20, through control terminals 15*a* and 15*b* of switching network 15 and switch contact 33*b* to conductor R1 causes network 15 to begin to conduct. Under these conditions subscriber line current flows from conductor R2 through switch contact 34*b*, diode 18, boost supply 12, the power terminals 15*c* and 15*b* of switching network 15, and switch contact 33*b* to conductor R1. As a result, conductor T2 becomes positive from conductor R2 by a voltage equal to the sum of the voltages across battery B and boost supply 12. Thus, when the central office battery applies a voltage of a second polarity between conductors R1 and T1, a boosted voltage of the same polarity appears between conductors R2 and T2.

In view of the foregoing, it will be seen that booster circuit 10 provides the subscriber line with an increased d-c operating voltage in spite of supervisory reversals in the polarity of the connections of central office battery B. Booster circuitry of this character is further described in U.S. Pat. No. 3,621,143, granted to Charles W. Chambers, Jr., on Nov. 16, 1971.

To the end that voltage booster circuit 10 may be disconnected from subscriber line conductors R1-R2 and T1-T2 during the testing thereof, there is provided test-through circuitry 30 which, in the present illustrative embodiment, includes a booster disconnect device which here takes the form of a relay having a coil 32 and make-before-break contacts 33 and 34. Test-through circuit 30 also includes a sensing network which here comprises a voltage divider including resistors 36 and 37 and diodes 38 and 39, and a control network which here comprises PNP transistors 41, 42 and 43, resistors 45, 46 and 47 and a diode 48.

The networks making up test-through circuit 30 maintain contacts 33 and 34 in the position shown in solid lines in the drawing so long as either conductor R1 or conductor T1 is substantially negative from ground, i.e., the positive terminal of the central office battery, here labeled B+. Since these two negative polarity conditions exist when the subscriber line is being used by a subscriber, it is clear that booster circuit 10 is present to impart the desired increase in subscriber line current in spite of the presence of test-through circuit 30.

The networks making up test-through circuit 30 also force contacts 33 and 34 into the dotted-line portions shown in the drawing to remove and bypass booster circuit 10 when subscriber line conductors R1 and T1 are both either positive from ground or near ground potential. Since the latter conditions exist when subscriber line testing occurs, it will be seen that booster circuit 10 cannot be present in the circuit during line testing and, therefore, cannot interfere with the desired test measurements. Thus, the circuit of the invention connects booster 10 in aiding relationship to the subscriber line current when the presence of booster 10 improves the quality of service over the subscriber line and disconnects booster 10 when the presence thereof would interfere with the testing of the subscriber line.

The operation of test-through circuit 30 will now be described. When subscriber line conductor T1 is positive from conductor R1, conductor T1 is at ground potential, i.e., at the potential of central office battery terminal B+, and conductor R1 is negative from ground, i.e., at the potential of central office battery terminal B−. Since one end of voltage divider 36-37 is connected to positive central office battery terminal B+ and since the other end thereof is connected to negative central office battery terminal B−, through diode 38 and conductor R1, a voltage appears across resistor 37 which forward biases the base-emitter junctions of transistors 41 and 42. Under these conditions transistors 41, 42 conduct current from terminal B+, through resistor 45, the collector-emitter circuits of transistors 41 and 52, and resistor 47 to terminal B−. As a result of the voltage thus developed across resistor 47 and as a result of the forward threshold voltage of diode 48, the base-emitter and collector-emitter circuits of transistors 43 are non-conductive, causing relay coil 32 to maintain contacts 33 and 34 in the solid line positions shown in the drawing. Thus, contacts 33 and 34 are in the de-energized positions shown in solid lines in the drawing when the central office battery renders conductor R1 negative from ground.

Similarly, after a supervisory polarity reversal, when central office battery B renders conductor R1 positive from conductor T1, diode 39 conducts current from positive central office battery terminal B+, through voltage divider 36-37 to conductor T1 to maintain transistors 41 and 42 in their conducting states and transistor 43 in its non-conducting state. Thus, contacts 33 and 34 are in the de-energized positions shown in solid lines in the drawing when the central office battery renders conductor T1 negative from ground.

Since one or the other of the above described polarity conditions exist when the subscriber line is being used by a subscriber, it will be seen that test-through circuit 30 connects voltage booster circuit 10 in current increasing relationship to the subscriber line under circumstances of normal subscriber line use. Thus, test-through circuit 30 does not interfere with the usage of the subscriber line or with the desired effect of voltage booster 10 on the current in the subscriber line.

When the subscriber line is being tested, however, both conductor R1 and conductor T1 are either positive from ground or approximately at ground potential. As a result, neither diode 38 nor diode 39 conducts sufficient current through voltage divider 36-37 to maintain transistors 41 and 42 in their conducting states. The reduced current through transistors 41 and 42, in turn, allows current to flow through the path including terminal B+, resistors 45 and 46, the base-emitter circuit of transistor 43, diode 48 and resistor 47 to terminal B−. As a result, transistor 43 turns on and conducts a current from terminal B+, through resistors 45 and 46, collector-emitter circuit of transistor 43, and relay coil 32 to terminal B−. This current energizes relay coil 32 and thereby causes relay contacts 33 and 34 to assume the dotted line positions shown in the drawing, that is, with movable contact 33*c* in contact with make contact 33*a* and out of contact with break contact 33*b*. Under these conditions, conductors R1 and R2 are shorted together through a bypass conductor 49 and voltage booster circuit terminals 25 and 26 are disconnected from the subscriber line. Thus, contacts 33 and 34 are in the energized positions shown in dotted lines in the drawing when neither conductor R1 nor conductor T1 are appreciably negative from ground.

Since the above described voltage condition exists when the subscriber line is being tested, it will be seen that testthrough circuit 30 disconnects voltage booster 10 from the subscriber line during testing. Thus, test-through circuit 30 sutomatically prevents voltage booster circuit 10 from interfering with the taking of test measurements.

Because contact sets 33 and 34 are provided with break contacts 33*b* and 34*b*, booster circuit 10 is unable to conduct current across the line during line testing, as, for example, through neon tube 22 and resistor 23. Thus, the presence of break contacts 33*b* and 34*b* allows test readings taken at conductors R1 and T1 to reflect the condition of the subscriber line beyond conductors R2 and T2 and to not reflect the existence of shunt paths through the voltage booster circuitry.

Because contacts 33 and 34 include make contacts 33*a* and 34*a* which close before the opening of break contacts 33*b* and 34*b*, the subscriber line current which flows through the subscriber line, through voltage booster circuit 10, before the energization of coil 32 is not interrupted by the energization of that coil. This is because the subscriber line current which flows through booster 10 before coil 32 is energized is simply shifted to bypass conductor 49 after coil 32 is energized. Consequently, test-through network 30 does not prevent the operation of telephone system relays which must hold a subscriber line into contact with a central office as, for example, relays which must hold a line during certain types of automatic number identification. Thus, the circuit of the invention can be used in telephone systems having a variety of types of switchgear.

Another advantage of test-through circuit 30 is that it disconnects booster circuit 10 from a PBX trunk as a PBX attendant removes her equipment from the trunk. As a result, switching networks 14 and 15 become nonconductive and thus prevent booster circuit 10 from producing boost voltage of either polarity as the line is connected to the party receiving a call. This prevents booster 10 from producing a voltage which bucks the line voltage in PBX systems where polarity reversals may occur at various stages of the completion of a call through the PBX.

It will be understood that the test-through circuitry of the invention may be used with voltage booster circuits of types other than that shown in the drawing. Booster circuit 10 may, for example, be replaced by a voltage booster circuit which is controlled in accordance with the polarity of the voltage between the line conductors rather than by the direction of flow of current in the line. In addition, substituted the voltage booster circuit may have one or more voltage boost supplies connected in each side of the subscriber line. In voltage booster circuits of the latter type, it is, of course, desirable to provide sets of contacts such as 33 and 34 and a bypass conductor such as 49 for the voltage booster circuitry in each side of the subscriber line.

In view of the foregoing, it will be seen that a test-through circuit constructed in accordance with the invention is adapted to provide unrestricted subscriber line testing in the presence of a wide variety of telephone system and voltage booster circuit configurations. It will further be seen that the circuit of the invention is not affected by the internal operations of the booster circuit with which it is used, and, therefore, can be used with voltage booster circuits of existing types whether or not such booster circuits have an inherent test-through characteristic.

It will be understood that the above described embodiment is for descriptive purposes only and may be changed or modified without departing from the spirit and scope of the appended claims.

What is claimed is:

1. In a test-through circuit for operation in connection with a subscriber line having voltage booster circuitry, in combination, booster disconnect means for respectively connecting and disconnecting the voltage booster circuitry to and from the subscriber line, said disconnect means having a first state in which each line terminal of the voltage booster is connected to the subscriber line and having a second state in which at least two of the line terminals of the voltage booster are disconnected from the subscriber line, sensing means for detecting the presence and absence of a negative voltage between any of the conductors of the subscriber line and a reference of fixed potential, means for connecting said sensing means between each conductor of the subscriber line and said reference, control means for automatically establishing the first state of said disconnect means, during the normal operating condition upon the appearance of a negative voltage between any of the conductors of the subscriber line and said reference and for automatically establishing the second state of said disconnect means, during the line test condition, when no negative voltage appears therebetween, means for connecting said control means to said sensing means and to said disconnect means, a bypass conductor and means for connecting said bypass conductor to the subscriber line to bypass the voltage booster circuitry when said disconnect means is in its second state.

2. A test-through circuit as set forth in claim 1 in which said disconnect means comprises a relay having at least two sets of make-before-break contacts.

3. A test-through circuit as set forth in claim 1 in which said sensing means includes a first diode for connection to one conductor of the subscriber line and a second diode for connection to another conductor of the subscriber line.

4. In a test-through circuit for operation in connection with a subscriber line having voltage booster circuitry, in combination, a bypass conductor, a disconnect relay having a coil and a plurality of make-before-break contacts, said contacts serving as means for connecting at least two of the line terminals of said booster circuitry to the subscriber line when said contacts are in a first state and for connecting said bypass conductor to the subscriber line in place of said booster circuitry when said contacts are in a second state, sensing and control means for energizing said coil when the potential between ground and each of the conductors of the subscriber line is positive and for de-energizing said coil when the latter potential has a substantial negative value, said sensing and control means including a plurality of diodes for connection to respective conductors of the subscriber line, and means for connecting said sensing and control means to the subscriber line and to said coil.

5. In a test-through circuit for operation in connection with a subscriber line having voltage booster circuitry, in combination, booster disconnect means for respectively connecting and disconnecting the voltage booster circuitry to and from the subscriber line, said disconnect means having a first state in which each line terminal of the voltage booster is connected to the subscriber line and having a second state in which at least two of the line terminals of the voltage booster are disconnected from the subscriber line, voltage developing means for developing a control voltage which varies in accordance with the negative voltage between either conductor of the subscriber line and a reference terminal, a first diode for connecting said developing means to said reference terminal and to one conductor of the subscriber line, a second diode for connecting said developing means to said reference terminal and to another conductor of the subscriber line, each of said diodes being connected in series with said developing means, control means for automatically establishing the first state of said disconnect means when the voltage developed by said developing means indicates that negative operating voltage is being applied to either conductor of the subscriber line and for automatically establishing the second state of said disconnect means when the voltage developed by said developing means indicates that negative operating voltage is not being applied to either conductor of the subscriber line, means for connecting said control means to said sensing means and to said disconnect means, a bypass conductor and means for connecting said bypass conductor to the subscriber line to bypass the voltage booster circuitry when said disconnect means is in its second state.

* * * * *